(12) United States Patent
Arora et al.

(10) Patent No.: US 11,822,882 B2
(45) Date of Patent: Nov. 21, 2023

(54) AUTOMATIC ENHANCEMENT OF PARAGRAPH JUSTIFICATION

(71) Applicant: Adobe Inc., San Jose, CA (US)

(72) Inventors: Aman Arora, Delhi (IN); Ashish Jain, Delhi (IN)

(73) Assignee: Adobe Inc., San Jose, CA (US)

(*) Notice: Subject to any disclaimer, the term of this patent is extended or adjusted under 35 U.S.C. 154(b) by 169 days.

(21) Appl. No.: 17/350,519

(22) Filed: Jun. 17, 2021

(65) Prior Publication Data
US 2022/0405469 A1  Dec. 22, 2022

(51) Int. Cl.
*G06F 40/189* (2020.01)
*G06F 40/191* (2020.01)
*G06F 40/109* (2020.01)

(52) U.S. Cl.
CPC .......... *G06F 40/189* (2020.01); *G06F 40/109* (2020.01); *G06F 40/191* (2020.01)

(58) Field of Classification Search
CPC ..... G06F 40/109; G06F 40/189; G06F 40/191
See application file for complete search history.

(56) References Cited

U.S. PATENT DOCUMENTS

| | | | |
|---|---|---|---|
| 7,797,624 B2 | 9/2010 | Williamson et al. | |
| 8,306,356 B1 * | 11/2012 | Bever | G06V 30/268 382/292 |
| 2003/0055851 A1 * | 3/2003 | Williamson | G06F 40/103 715/251 |
| 2013/0047078 A1 * | 2/2013 | Bever | G06V 30/268 715/245 |
| 2014/0115432 A1 * | 4/2014 | Turner | G06F 40/114 715/251 |

FOREIGN PATENT DOCUMENTS

| | | | | |
|---|---|---|---|---|
| WO | WO-0142976 A1 * | 6/2001 | ............ | G06F 17/211 |
| WO | WO-2016125177 A1 * | 8/2016 | ........... | G06F 17/212 |

OTHER PUBLICATIONS

W3C, "Visual Presentation: Understanding SC 1.4.8," Understanding WCAG 2.0: A guide to understanding and implementing WCAG 2.0, pp. 1-8, retrieved via Internet: https://www.w3.org/TR/UNDERSTANDING-WCAG20/visual-audio-contrast-visual-presentation.html.

\* cited by examiner

*Primary Examiner* — Chau T Nguyen
(74) *Attorney, Agent, or Firm* — NICHOLSON DE VOS WEBSTER & ELLIOTT LLP

(57) ABSTRACT

Embodiments are disclosed for automatic enhancement of paragraph justification. A method includes receiving a selection of at least one paragraph, determining a plurality of penalty values for at least one typographic feature by varying a typographic feature value, the penalty values indicating a deviation from an optimal layout of the at least one paragraph, determining at least one optimal penalty value for the at least one typographic feature, the at least one optimal penalty value corresponding to at least one optimal typographic feature value of the at least one typographic feature, determining a priority for each of the at least one typographic feature based on a plurality of justification rules and the at least one optimal penalty value, and updating the at least one typographic feature of the at least one paragraph based on the priority and the at least one optimal typographic feature value.

20 Claims, 11 Drawing Sheets

600

*Typogra-
phy is the use of type
to advocate, communicate, cele-
brate, edu- cate, elaborate, illumi-
nate, and humiliate. Along the
way, the words cut out pages
become art*

*Typography is the use of type to advocate, communicate, celebrate, educate, illuminate and ultimately, through the work and pages become art.*

FIG. 7

AUTOMATIC ENHANCEMENT OF PARAGRAPH JUSTIFICATION

BACKGROUND

Paragraph layout in a document production application involves selection and placement of line breaks to produce a visually pleasing appearance within a paragraph cell that defines the space allotted for the paragraph. Changes in the style of the text, e.g., fonts, formats, line heights, and point size, can complicate the task, particularly when layout is performed within non-rectangular shapes. In addition, text styles and shape complexity can significantly increase computational overhead and processing time.

Previously, page layout programs would compose paragraphs line by line. Because there was only a limited number of word spaces across which the extra space at the end of the line could be distributed, this often-caused bad type color. These line-by-line techniques were then replaced with automated paragraph layout systems that analyze the word spaces across a whole paragraph, consider the possible line breaks, and optimize earlier lines in the paragraph to prevent bad breaks later in the paragraph. Such automated systems result in fewer hyphens and better breaks where hyphens do occur, and also results in better spacing. By evaluating an entire paragraph, there are more places where the system can add or subtract an imperceptible amount of space, achieving better layout results When a composition system composes type using any composer, it tries to fit as many characters as it can on each line. This process is called justification. Hyphenation is often used to achieve this goal by packing as much of the last word on each line as the rules of hyphenation will allow. Together this mechanism of text composition is called hyphenation and justification, or H&J. Text composers achieve justification by varying the size of the word spaces on the line or in the entire paragraph to get even looking word and letter spacing. However, almost always the spacing of text post justification is uneven and poor or words are improperly hyphened, leading to a poor result does not look appealing and which is often difficult to read.

These and other problems exist with regard to performing text justification in electronic systems.

SUMMARY

Introduced here are techniques/technologies that enable automatic enhancement of paragraph justification. This greatly simplifies the user experience when composing paragraphs. For example, a user may select a portion of text in a document (e.g., a paragraph or more of text) and select a "justification enhancement" icon. Once invoked, an automatic paragraph justification system determines optimal values of one or more typographic features (e.g., glyph size, word spacing, letter spacing, etc.) to reduce a penalty value of the selected text. This penalty represents the difference between the current settings and the ideal settings, with lower penalty values being better. Once the optimal feature values have been identified, they may be automatically applied to the selected text or presented to the user for review.

The system also prioritizes its recommendations of optimal feature values to the user based on which changes provide the best penalty reductions as well as the best readability improvements based on the characteristics of the font in use. For example, a user interface element, such as a window, panel, etc., may be presented to the user which shows the available optimizations that have been identified for the text and how much benefit each optimization is. The user can select which optimal values to be applied to their text and the total improvement of the selected optimizations is then shown to the user and applied to the text.

As such, embodiments automatically find the optimal settings of typographic features and present the results to the user who can then make an informed decision as to which settings or combination of settings to use to improve the paragraph's readability. This enables users who do not have specialized knowledge of typography, legibility, accessibility, etc. to improve the layout of their documents easily and intuitively.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIGS. 6 and 7 illustrate examples of automatic enhancement of paragraph justification in accordance with one or more embodiments;

DETAILED DESCRIPTION

Figure 1:
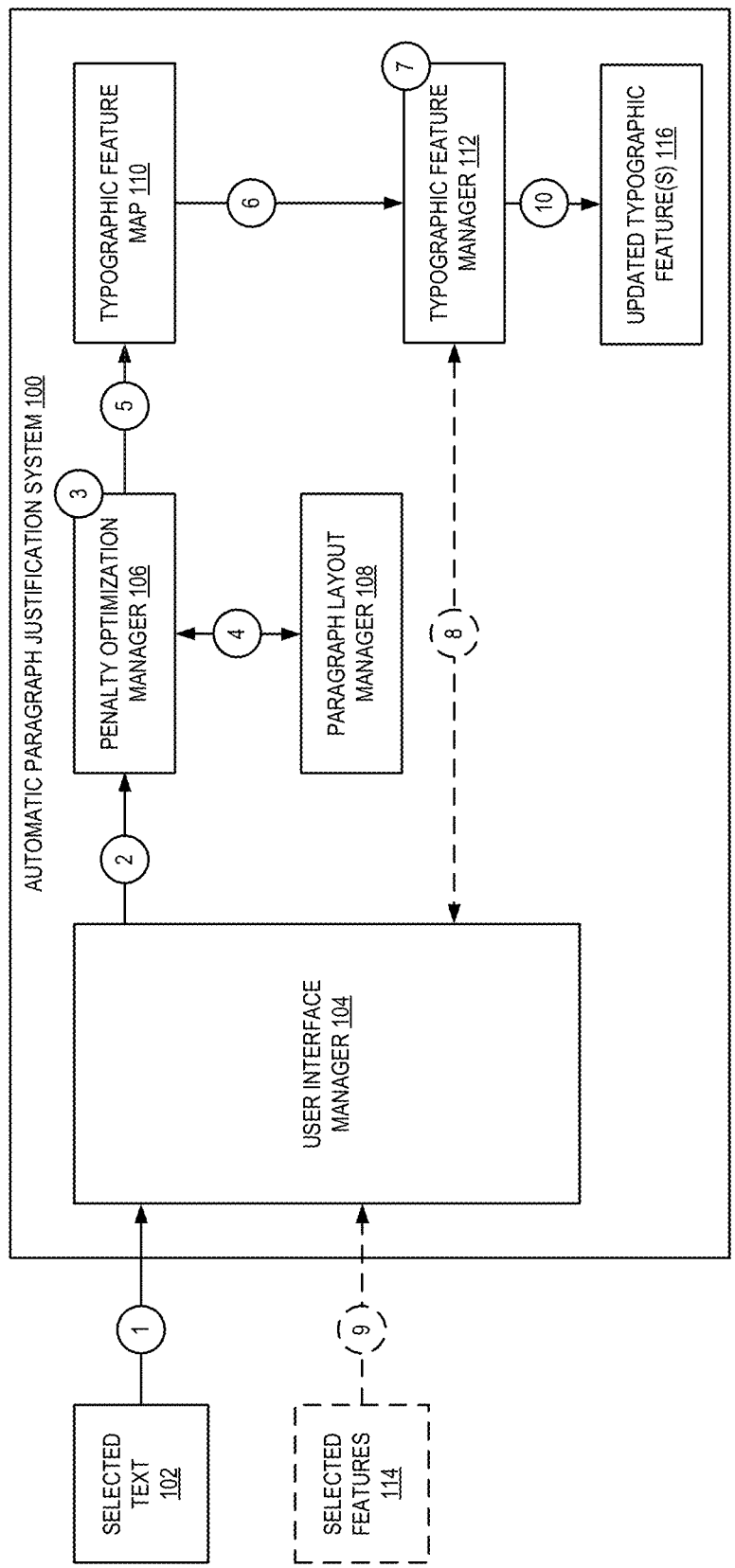
FIG. 1 illustrates a diagram of a process of automatic enhancement of paragraph justification in accordance with one or more embodiments.

One or more embodiments of the present disclosure include techniques that enable automatic enhancement of paragraph justification. Conventional text composers vary typographic features (word spacing, letter spacing, etc.) to apply a justification to a paragraph. This often does not yield ideal results, with uneven spacing and improper hyphenation being common issues. The ability of the user to further refine the justification settings to improve the results is limited both because typography is a specialized skill not all users possess and because the options are intimidating. Embodiments automatically find the optimal settings of typographic features and present the results to the user who can then make an informed decision as to which settings or combination of settings to use to improve the paragraph's readability. This is presented in terms of "penalty" reduction, where penalty represents the difference between the current settings and the ideal settings, with lower penalty values being better. The system also prioritizes its recommendations to the user based on which changes provide the best penalty reductions as well as the best readability improvements based on the characteristics of the font in use.

Modern text composers can automatically compose paragraphs that suffer from improper hyphenation and justification. This leads to varying text color and spacing that makes reading difficult. While these settings can be manually adjusted, research has shown that approximately 90% of page layout software users fear making manual adjustments that determine how the spacing of every character and word in their text is managed. These controls are often intimidating and difficult to find in the text composer user interface. Additionally, the average user may not be skilled enough to be able to differentiate between a good and a bad paragraph layout simply by looking at it. This limits the effectiveness of manual adjustment.

Embodiments provide an interactive and smart approach to actively manage hyphenation and justification. This leads to improved document legibility and makes the resulting documents more aesthetically pleasing and easier to read.

As discussed, improper hyphenation and justification can lead to poor type color. However, it is harder to achieve uniform type color in justified text because the space left over at the end of the line has to be redistributed across the line to give a smooth right margin. Conventional text composers do not provide an automated way to improve justification and enhance type color and readability. Additionally, improper or uneven text size, font faces, glyph sizes, leading, and line and paragraph length are some factors that need to be corrected by designers manually. Setting proper text justification and correcting uneven text spacing takes a lot of time. This is especially important in composition design as such text can be especially difficult for people with dyslexia, reducing the accessibility of the documents being created.

Further, poor justification causes distractions when reading. For example, too much variation in word or letter spacing will cause the tight lines to look darker than the rest of your text and disturb the paragraph's rhythm. At the other extreme, if the word spacing is too big, we get unsightly "rivers" of white running through lines. This is problematic when the columns are narrow because the eye is tempted to read down through the gaps rather than from left to right.

Conventional systems do not enable average users to effectively address these issues when composing text. For example, some systems can detect hyphenation or justification issues, but do not provide a means for the user to solve the identified issues. This leaves the user on their own to figure out a solution on their own. This typically leads to users to give up or to waste time experimenting to identify potential improvements. For example, the user may be able to select minimum/maximum/desired values for various typographic features. However, the user is left with no guidance on what these values should be to achieve a desired result. Knowing what each option does and adjusting these parameters to right values is not easy task. Even for users who use these settings, it is not easy to manually set these parameters using trial and error.

The values that will work depend on a number of factors the user may not be aware of. For example, even at a given measure, no one set of feature values will always work. The typeface makes a difference, because some—like Bodoni— need a looser set and look particularly bad when allowed to set tight. By contrast, some typefaces, such as Times Roman, were designed for newspaper use and have slightly compressed character widths. Settings that work for such faces over narrow measures will not work for a wider-setting book face, such as Garamond. Sans serif faces tend to suffer more from tight spacing than serifed faces do. They also need special treatment in wider measures, where spacing that is too loose can make these faces look particularly airy. Point size also matters, because that helps determine how many characters (hence spaces) appear on each line. As such, correcting hyphenation and justification violations in a given document manually is an extremely difficult and time-consuming task (and for unskilled designers likely impossible).

FIG. 1 illustrates a diagram of a process of automatic enhancement of paragraph justification in accordance with one or more embodiments. As shown in FIG. 1, an automatic paragraph justification system 100 can aid a designer in finding optimal feature values when composing text. In some embodiments, automatic paragraph justification system 100 can be implemented as part of a word processing application such as ADOBE® ACROBAT®, ADOBE® INDESIGN®, or another word processing application.

In the example of FIG. 1, a user can compose a new document, load a previously composed document, or otherwise make text available to automatic paragraph justification system 100. For example, the user may open an existing document, or create a new document, in a word processing application that implements automatic paragraph justification system 100. The user can choose text to be enhanced. For example, the user may highlight (e.g., "select") text displayed in a graphical user interface (GUI) provided by automatic paragraph justification system 100, a word processing application, a browser application, or other system. At numeral 1, the user provides selected text 102 to automatic paragraph justification system 100 via user interface manager 104. For example, the user may select the text using an input device (e.g., mouse, keyboard, touchscreen, or other input device or devices) and select a user interface (UI) element associated with the automatic paragraph justification system 100.

At numeral 2, the selected text 102 is provided to penalty optimization manager 106. Penalty optimization manager 106 is responsible for determining optimal typographic features values that reduce the penalty of the selected text. With constant-length lines, paragraph layout is straightforward and predictable. However, when a paragraph cell contains varied-length lines, complexity of paragraph layout can increase. Penalty values can be calculated and used to differentiate visually pleasing paragraph layouts from less desirable ones. A penalty value may take a number of typographic features into consideration. For instance, a penalty value may take into account such typographic features as letter size, word spacing, letter spacing, changes in word or letter format, and hyphenation. In addition, paragraph consistency may affect a penalty value. For instance, an increased penalty can be assigned to a line with narrow word spacing if it immediately follows a line with wide word spacing.

Hyphenation may affect a penalty value in several different ways. For instance, a penalty value may take into account where a particular hyphenation is occurring within an individual word, assigning greater penalties to less desirable hyphenation. In addition, repetitive hyphenation within a paragraph may further increase a penalty value. Moreover, hyphenating particular words, such as the last word on a page, may increase a penalty value.

Penalty optimization manager 106 varies the typographic feature values within a range and determines the penalty value for each variation, at numeral 3. For example, the selected text is characterized by a number of typographic feature values (e.g., corresponding to glyph scaling, letter spacing, word spacing, etc.), these may be referred to as "original typographic feature values." The penalty optimization manager 106 can vary these values within a range and request that paragraph layout manager 108 calculate a new penalty, at numeral 4. For example, the range may be +/−5% of the original typographic feature values. In some embodiments, the range may be a different fixed value, may be configurable by the user or other entity, or may vary based on document properties, organizational settings, or other factors.

In various embodiments, the paragraph layout manager 108 may implement various paragraph optimization techniques provided by word processing applications. For example, the paragraph layout manager 108 may be the Adobe Paragraph Composer provided by Adobe InDesign. However, any paragraph composer which provides penalty values for a paragraph (or more) of text when varying typographic features may be used. In some embodiments, paragraph layout manager 108 implements a linear beginning-to-end pass through the text of a paragraph. A node is an unbreakable segment of one or more characters (e.g., typically a syllable in the English language, although words or phrases could be defined as unbreakable). For each node in the paragraph, an optimal line break scheme for paragraph layout ending in that node is calculated. The phrase "optimal line break scheme for paragraph layout" is used to refer to the most visually pleasing collection of line breaks in a paragraph, as determined by penalty values. As the process moves to consider subsequent nodes, the previously calculated optimal line break schemes for paragraph layouts, provide data that facilitates subsequent calculations. No line's content is defined until the process has considered every node in the paragraph. The last node in the paragraph, then, defines a last line that starts with a start node calculated by the process to produce an optimal line break scheme for paragraph layout. That calculated start node also defines the end of the second to last line because the nodes are placed sequentially in the paragraph layout.

Many of the exemplary implementations described in this specification are described in the context of the English language, however various embodiments are language agnostic. In English, characters are read from left to right on horizontal lines beginning with the top line. A process in accordance with various embodiments, however, may be implemented for other languages as well. In some languages, for instance, characters are read from right to left on horizontal lines. And in still other languages characters are read from top to bottom on vertical lines. A process in accordance with the invention is equally effective in these and other contexts. For instance, the process may progress through the characters, nodes, words, or phrases of a paragraph, in the reading order of that paragraph, as defined by the particular language.

For example, in one implementation, the paragraph layout manager 108 processes each paragraph node by node. Beginning with the first node, one or more potential last lines for a paragraph ending in that ending node are defined. For instance, defining one or more potential last lines may simply involve defining or adjusting an index of candidate nodes that will be considered as possible start node of the last line. Because each node in the index is unique, each node in the index may define a unique last line of a paragraph that ends with the same ending node. For each potential last line, a paragraph penalty is calculated. The respective paragraph penalties are each based on the cumulative penalty of all lines in the paragraph. Node M(N) is defined as the node that starts the last line in a paragraph ending in node N such that paragraph penalty is minimized. This process is then repeated for subsequent nodes until the end of the paragraph is reached. As the process analyzes each subsequent node, potential last lines are defined for a paragraph that ends in that node. Again, defining one or more potential last lines may simply involve defining or adjusting an index of candidate nodes that will be considered as the possible start node of the last line. For each potential last line that is considered, a paragraph penalty is calculated based on the cumulative penalty of all lines in the paragraph. The cumulative paragraph penalty is calculated by first calculating a last line penalty for the potential last line. Defining each potential last line also defines the potential end of the preceding line. An optimal line break scheme for paragraph layout ending in each respective potential node that may end the preceding line was already calculated. Therefore, the optimal line break scheme for the whole paragraph can be determined by minimizing the collective penalty values of a potential last line and the previously calculated optimal line break scheme for paragraph layout associated with the node that ends the second to last line. After this determination is made, node M(N) is defined as the node that starts a last line of a paragraph ending in node N. In this manner, Node M(N) is defined such that the penalty for the whole paragraph is minimized.

The paragraph layout manager 108 can vary the typographic features as instructed by the penalty optimization manager 106 and then calculate a new penalty value, similar to the process described above, given this new set of typographic features. In some embodiments, the penalty optimization manager 106 determines optimum values of each typographic feature along with a percentage reduction in penalty that the application of that feature results in. For example, each typographic feature (e.g., word spacing, letter spacing, glyph scaling, etc.) is varied and then a search algorithm is used to pick values in the range of the original values used in the typeface. The paragraph layout manager 108 is then invoked to calculate the penalty for that set of feature values. The small range ensures that the features are changed minimally, so that the perceptibility of the change is minimized. The optimal value is the value determined to improve the penalty most significantly (e.g., greater than a threshold improvement value) and has the least change in respective typographic feature value. This ensures the least deviation from the spacing between characters and words defined in the font itself since the designers build into each font the spacing that works best for that face.

For example, the penalty optimization manager may request that the paragraph layout manager 108 determine the penalty for a maximum value of the range and a minimum value of the range. Once these values are obtained from the paragraph layout manager 108, the penalty optimization manager 106 can store these values in typographic feature map 110. The penalty optimization manager 106 can continue to search for the optimal value based on the search algorithm and update the values stored in the topographic feature map accordingly. Once the optimal value of one typographic feature has been identified, the penalty optimization manager 106 can then process the next typographic feature, and so on. The output of penalty optimization manager 106, at numeral 5, is a list of optimized feature values for each typographic feature and the corresponding penalty reduction associated with that value. These may be maintained in typographic feature map 112.

At numeral 6, typographic feature manager 112 can obtain the feature values and corresponding percentage penalty reduction from typographic feature map 110. The typographic feature manager 112 can apply one or more prioritization rules to the feature values to determine which typographic feature values to use to enhance the justification of the selected text 102, at numeral 7. The prioritization rules may vary depending on the properties of the typeface, the penalty reduction, etc. Optionally, in some embodiments, once the values have been prioritized by topographic feature manager 112, the enhancement options (e.g., the optimal typographic feature values and corresponding penalty reduction) can be presented to the user in the prioritized order. For example, at numeral 8, a UI element can be displayed to the user vis user interface manager 104 listing the enhancement options and their relative benefits. At numeral 9, the user can select one or more of the enhancement options via the UI element and an indication of selected features 114 can be returned to typographic feature manager 112, via user interface manager 104.

At numeral 10, the selected features 114 selected by the user or some or all of the features, as prioritized by the typographic feature manager, are then used to update the typographic features 116 of the selected text 102. Once updated, the selected text is composed using the selected optimized typographic feature values, resulting in an improved layout of the selected text. This does not require the user to have any knowledge of paragraph layout, readability, or other specialized knowledge.

Figure 2:
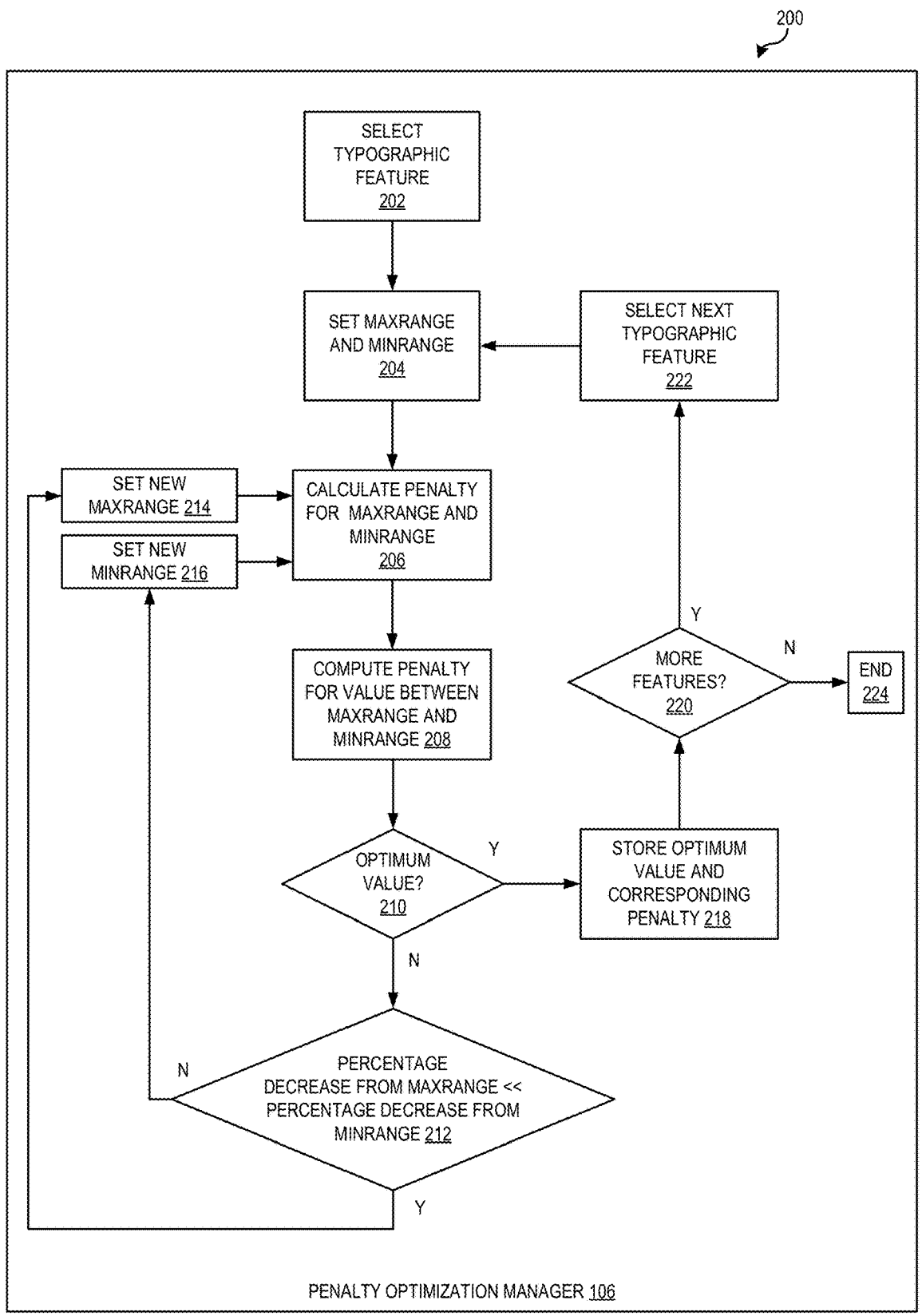
FIG. 2 illustrates a diagram of a process of penalty optimization in accordance with one or more embodiments.

FIG. 2 illustrates a diagram of a process 200 of penalty optimization in accordance with one or more embodiments. As discussed, embodiments automatically find the typographic parameters that can be adjusted to correct the hyphenation and justification violations. At the same time, embodiments also suggest the user the optimum values by which these parameters need to be adjusted in order to improve justification. These suggestions help preserve the visual consistency of the text by suggesting the minimal and the most optimal values for the typographic features.

To accomplish this, embodiments calculate penalty values to differentiate visually pleasing paragraph layouts from less desirable ones. The lower the penalty value, the better the paragraph layout. Embodiments search for the optimal and minimal values of one or more typographic features, such as letter spacing, glyph scaling etc. which enables the paragraph penalty to be reduced significantly. As discussed, this is performed automatically, without requiring manually manipulation of letter and word spacing for each paragraph, a process which becomes increasingly difficult for long documents.

In some embodiments, the user applies justification settings to the text as desired (e.g., full justified, left justified, right justified, etc.). Because of reasons described above, some paragraphs will look stretched while others may have compressed text—resulting in poor document legibility. The user can now select one or multiple paragraphs to be enhanced. As discussed, this enhancement includes improved justification, uniform spacing between words and characters, an improved line breaking scheme, etc.

As discussed, penalty optimization manager 106 determines optimal values of one or more typographic features within a range around the original values of these features. For example, when a user selects a portion of text in a document (e.g., a single paragraph up to the entire document), the selected text is processed by penalty optimization manager 106 to identify the optimal values. At 202 the typographic feature being processed is selected. For example, if word spacing, letter spacing, and glyph scaling are the typographic features being optimized, then initially word spacing may be selected. More or fewer typographic features may be processed and in various orders depending on implementation.

At 204, the maximum range (maxrange) and minimum range (minrange) values are set. For example, by default the range may be set to +/−5% of the original value of the typographic feature. If the original value of the typographic feature is $V_0$, then the minrange may be $0.95V_0$ and the maxrange may be $1.05V_0$. In various embodiments, this range may vary (e.g., larger or smaller) depending on the typographic feature being optimized, user preferences, or other factors. At 206, the penalty values are calculated for the minrange and the maxrange of the typographic feature being processed. As discussed, in some embodiments, a paragraph layout manager may be used to determine these values. In such instances, the selected text, updated with the minrange value, is provided to the paragraph layout manager and a penalty is received. Similarly, then the selected text, updated with the maxrange value, is provided to the paragraph layout manager and a penalty is received. A percentage penalty change is then calculated relative to the penalty value of the unmodified text. The initial max and minrange values may be stored in a typographic feature map or other memory or storage location.

At 208, a search algorithm is used to select a value in between the maxrange and minrange values. For example, a binary search may be used to select this value. The penalty for this intermediate value is then calculated. At 210, it is determined whether this value is the optimum value. For example, the new penalty value may be compared to the minrange penalty value and the maxrange penalty value and if it is less than a threshold difference between the two it may be determined to be an optimum. If not, at 212 it is determined whether the percentage decrease from the maxrange penalty value is much less than the percentage decrease from the minrange penalty value. If so, then the maxrange is updated to be the intermediate range at 216. If not, then the new minrange is set to be the intermediate value at 216. This processing may continue until the optimum value is identified.

Once the optimum value is identified, at 218 this optimum value and its corresponding penalty is stored. For example, these may be stored in typographic feature map 110 discussed above. In some embodiments, the percentage penalty reduction relative to the original penalty may also be stored. Once stored, the penalty optimization manager 106 then determines whether there are additional typographic features to be optimized at 220. If so, then the next typographic feature is selected at 222 and processing returns to setting the max and minrange values at 204. Once no more features are left to be optimized, the process ends at 224 and the resulting optimal typographic feature values are prioritized.

Figure 3:
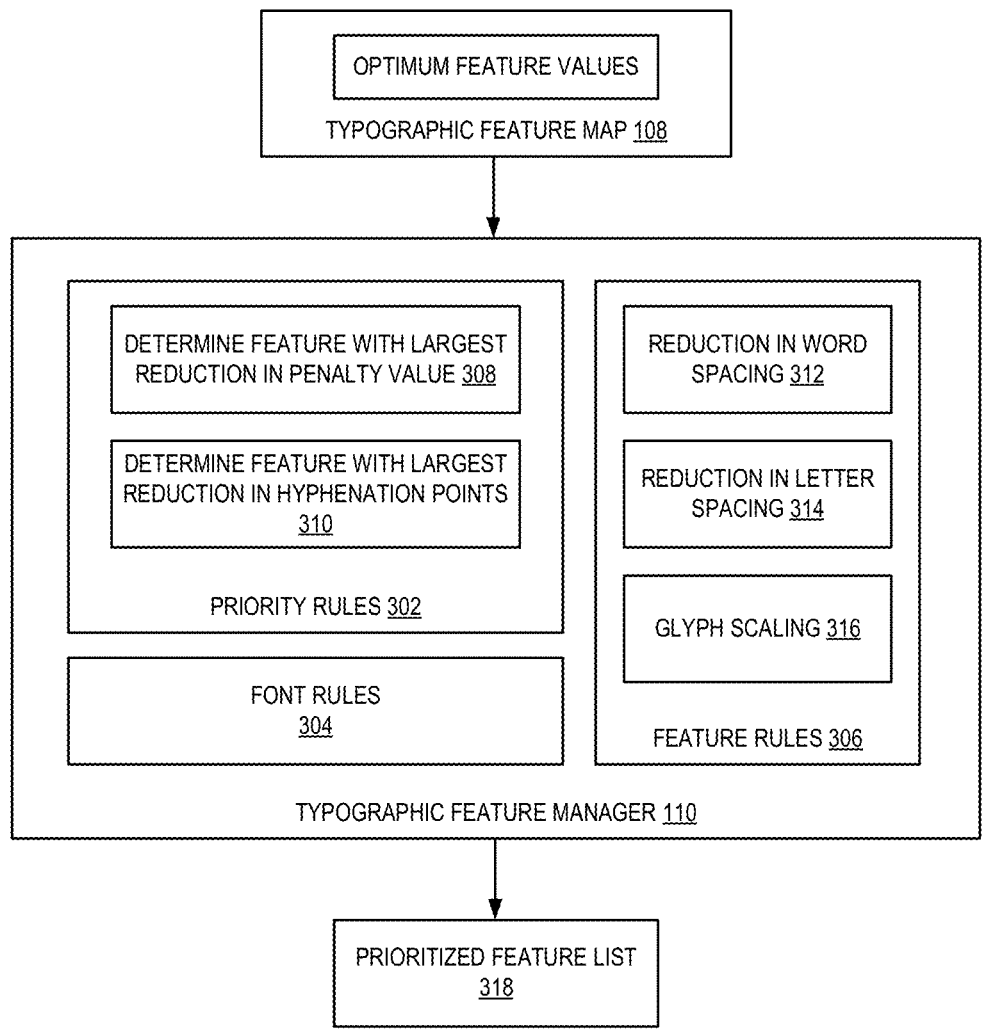
FIG. 3 illustrates a diagram of a process of feature prioritization in accordance with one or more embodiments.

FIG. 3 illustrates a diagram of a process of feature prioritization in accordance with one or more embodiments. As discussed, once the optimal feature values have been identified, they can be prioritized before being presented to the user and/or applied to the text. For example, multiple optimizations of different typographical features may be identified. These can be prioritized according to prioritization rules and presented to the user to select from the proposed list based on the context of the text. This helps designers enhance justification of text in their documents quickly while not requiring significant specialized knowledge of which features produce the best results. The optimal feature values can be obtained by typographic feature manager 112 from typographic feature map 110. These feature values can then be prioritized according to a plurality of rules.

As shown in FIG. 3, prioritization manager 300 can maintain a variety of justification rules including priority rules 302, font rules 304, and feature rules 306. For example, priority rules 302 may define rules based on enhancement performance. In some embodiments, the feature value that results in the largest reduction in penalty value 308 may be the highest priority feature. This may be followed by the feature value that results in the largest reduction of hyphenation points 310.

In some embodiments, specific rules may be applied depending on the font in use. For example, font rules 304 may include different rules for serif typefaces and sans serif typefaces. Sans serif typefaces may prioritize increasing letter spacing over other typographic features because sans serif typefaces tend to suffer more from tight spacing than serif typefaces do. Additionally, feature rules may define priority among different typographic features that are generally applicable to a variety of typefaces. For example, reduction in word spacing 312 is given the highest priority followed by letter spacing 314 followed by glyph scaling 316. This ensures that word or letter spacing is not varied by an amount that causes tight lines to look darker than the rest of the text and disturb the paragraph's rhythm. In some embodiments, the feature rules may also prioritize increasing letter spacing over reducing letter spacing. This is because tight type is harder to read than loose type. Aesthetics aside, doubling the width of a word space does less damage to the readability of type than halving it. Thus, the prioritization rules bias suggesting values that increase word spacing rather than decreasing word spacing. The final priority list is calculated based on the rules along with the penalties calculated by the penalty optimization manager 106. The prioritized feature list 318 is then provided to the user for review. Alternatively, the optimal feature values may be applied to the text according to their priority automatically until a penalty reduction threshold has been reached or until all optimal feature values have been applied.

Figure 4:
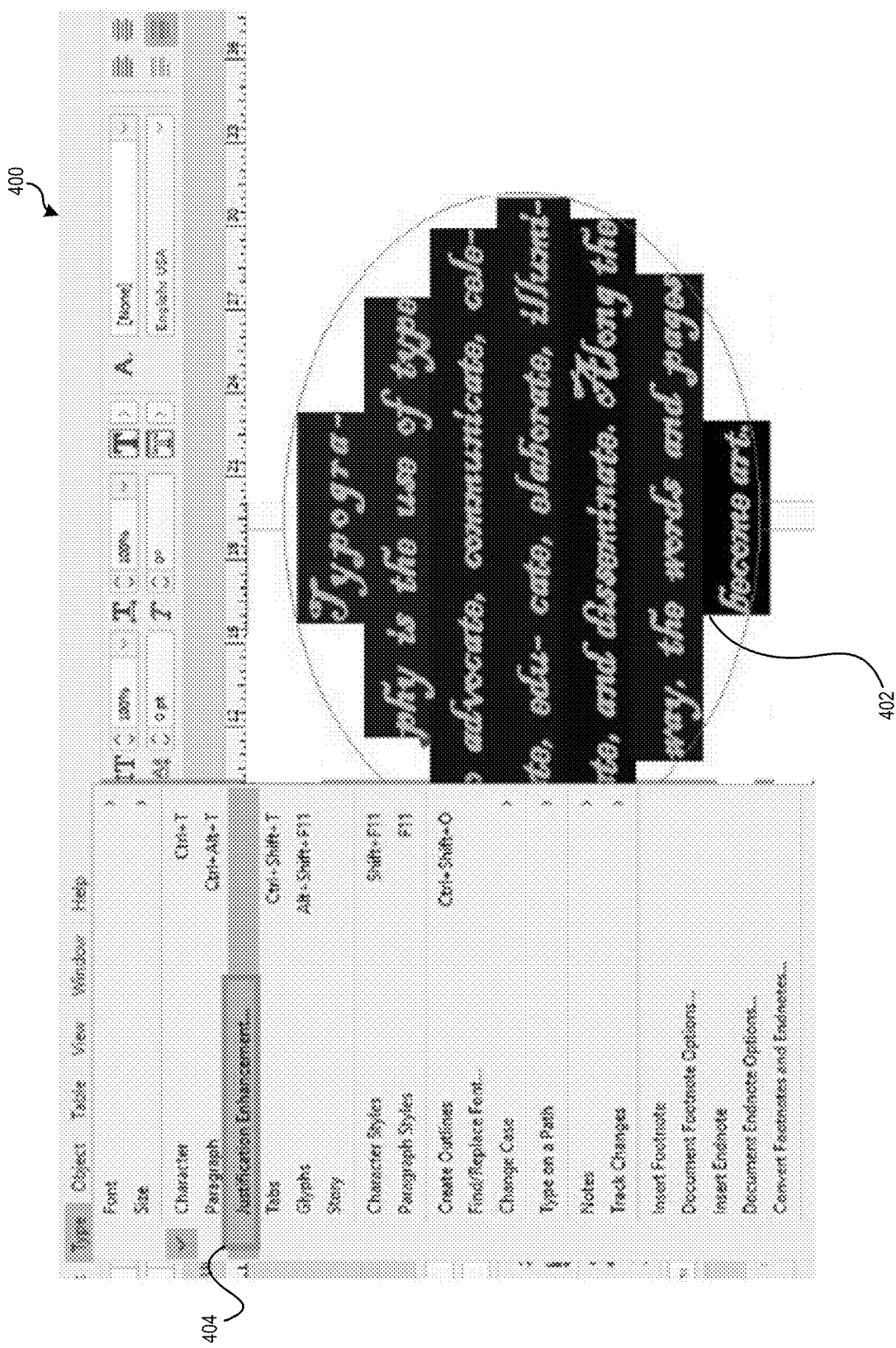
FIG. 4 illustrates an example user interface for enhancement of paragraph justification in accordance with one or more embodiments.

FIG. 4 illustrates an example user interface 400 for enhancement of paragraph justification in accordance with one or more embodiments. As shown in FIG. 4, a word processing application may enable the user to place text in various layouts. For example, text may be placed in oval paragraph cell 402 to emphasize the text, or otherwise call the text to the user's attention. However, these irregular-shaped paragraphs can be difficult to read, and the text layout may not be aesthetically pleasing. On examining the text layout in paragraph cell 402, one can observe that there are multiple problems with this text—particularly related to justification and hyphenation. Firstly, there are a lot of unwanted hyphenations that diminish the readability and visual appeal of this text (consider the word educate, which is composed as edu-cate by the default paragraph composer). Secondly, the text has uneven spacing between the words. Lastly, text within the circle frame has a distorted spacing at line ends. As a result, the text does not fill the circle nicely as intended by the designer because it has breaks and gaps.

The user can highlight this text and then select "Justification Enhancement" 404 from a menu element of the UI. Alternatively, the user may highlight the text and 'Right Click' and choose the 'Justification Enhancement' option from the resulting right click menu. Once Justification Enhancement 404 has been selected, the techniques described above are performed in the background (e.g., the optimal values of various typographic features of the selected text are identified). Once the prioritized features have been identified, then a UI element is shown to the user to review the enhancement options.

Figure 5:
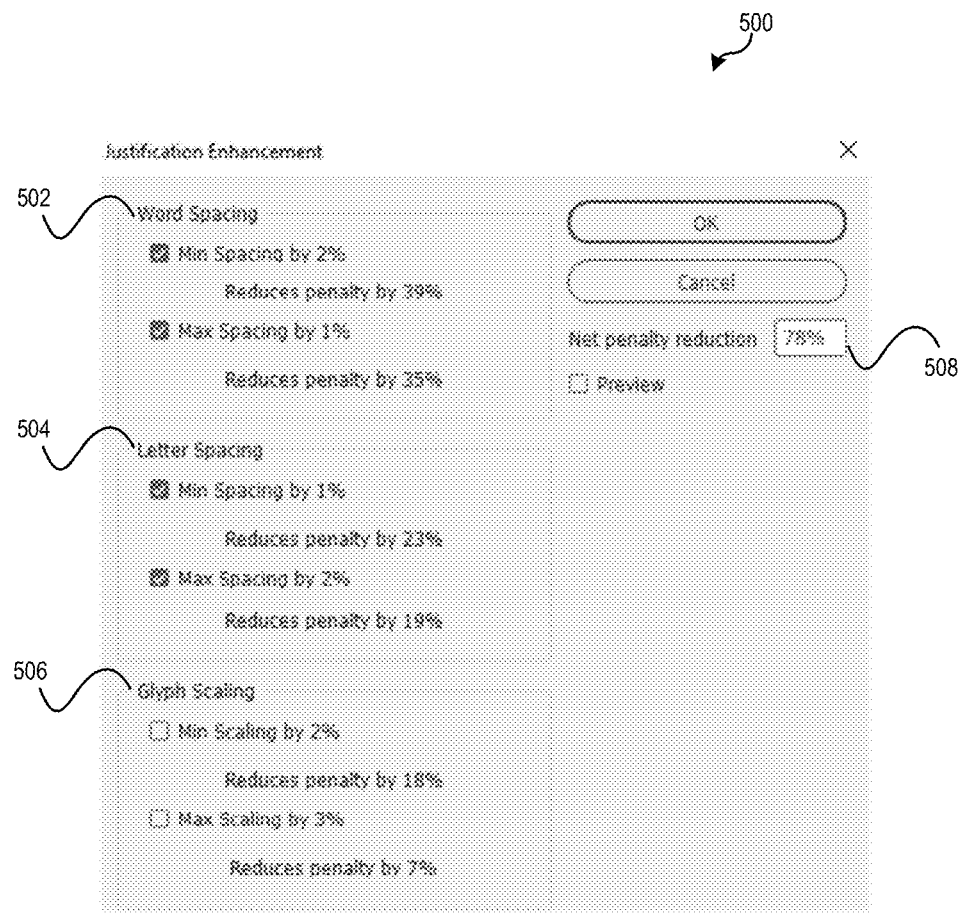
FIG. 5 illustrates an example user interface for selecting typographic feature settings to enhance paragraph justification in accordance with one or more embodiments.

FIG. 5 illustrates an example user interface for selecting typographic feature settings to enhance paragraph justification in accordance with one or more embodiments. As discussed above, after the processing steps, a new dialog box 500 is displayed which shows a list of options that enhance the justification. The user can choose one or more than one of the listed options and the combined penalty in case of multiple selections is calculated and shown in 508. In some embodiments, upon selecting the options, the text will be recomposed immediately, and the changes will be visible to the user. Alternatively, once the user makes their selection of enhancements, then the text will be recomposed once, applying all of the selected changes.

As shown in FIG. 5, the enhancements in the dialog box 500 may be ordered according to their priority. For example, word spacing 502 has highest priority. Within word spacing, increasing the minimum spacing by 2% reduces the penalty by 39%, making this the highest priority enhancement. This is example. positive values signify an increase of the associated feature and negative values signify decrease of the associated feature. Alternatively, embodiments show Increased Min-Spacing by 2% and Decreased Max spacing by 1% in the UI. Increasing maximum spacing by 1% reduces the penalty by 35%. Similarly, in letter spacing 504, increasing the minimum spacing by 1% reduces the penalty by 23% and increasing the maximum letter spacing by 2% reduces the penalty by 19%. In glyph scaling 506, increasing the minimum scaling by 2% reduces the penalty by 18% and increasing the maximum scaling by 3% reduces the penalty by 7%. When the selected enhancements are applied together, this results in a net penalty reduction 508 of 78%. The net penalty reduction may be determined by applying all of the selected values to the selected text and calculating the resulting penalty value. For example, paragraph layout manager 108 may be used to determine this net penalty value based on the selected features, as described above. In some embodiments, if the user again selects the same text, the dialog box will again show the settings than can further reduce the penalty value, if possible.

FIGS. 6 and 7 illustrate examples of automatic enhancement of paragraph justification in accordance with one or more embodiments. As shown in FIG. 6, the original paragraph 600 suffers from a number of deficiencies. For example, there are many unwanted hyphenations that diminish readability, the word spacing is irregular, and spacing is distorted at line ends, which distracts from the designer's intended "roundness" of the text block.

In FIG. 7, after the optimal typographic features have been applied, there are a number of improvements to the text 700. The unwanted hyphenations have been removed. The text also feels more consistently round, making the circular text wrap intended by the designer more prominently visible now.

Figure 8:
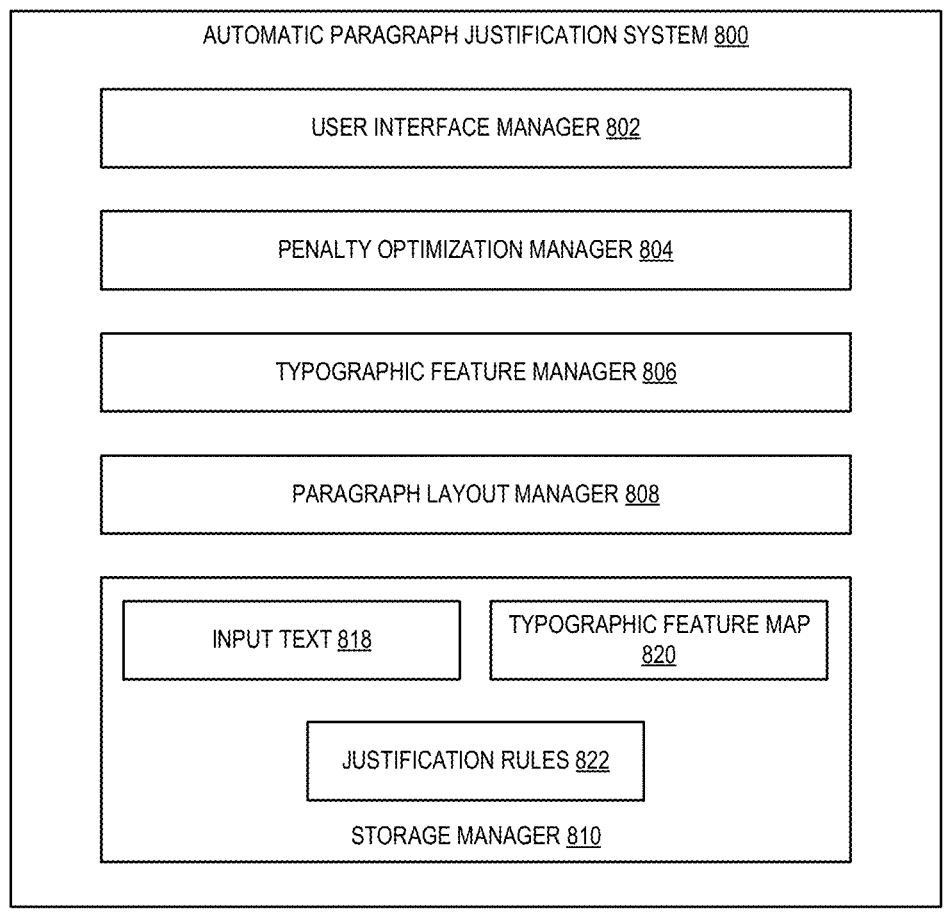
FIG. 8 illustrates a schematic diagram of automatic paragraph justification system in accordance with one or more embodiments.

FIG. 8 illustrates a schematic diagram of automatic paragraph justification system (e.g., "automatic paragraph justification system" described above) in accordance with one or more embodiments. As shown, the automatic paragraph justification system 800 may include, but is not limited to, user interface manager 802, penalty optimization manager 804, typographic feature manager 806, paragraph layout manager 808, and storage manager 810. The storage manager 810 includes input text 818, typographic feature map 820, and justification rules 822.

As illustrated in FIG. 8, the automatic paragraph justification system 800 includes a user interface manager 802. includes a user interface manager 802 that allows users to provide input to the automatic paragraph justification system. For example, the user interface manager 802 allows users to select text to be automatically enhanced. In some embodiments, the user interface manager 802 enables a user to select a document, a paragraph of text, or other text data stored or accessible by storage manager 810, such as input text 818. In some embodiments, the user interface manager 802 allows users to select specific portions of a document, such as one or more paragraphs, to be enhanced. For example, once a document has been opened using automatic paragraph justification system 800 (or a word processing application implementing automatic paragraph justification system 800), the user may select one or more portions of the document (e.g., one or more paragraphs of text). The user interface manager 802 further enables the user to select a justification enhancement option, to cause the automatic paragraph justification enhancement techniques described herein to be applied to the selected text. For example, the user may interact with one or more user interface elements (e.g., a top menu element, a right click menu element, etc.) to select the justification enhancement option. The selected text is then automatically enhanced using the techniques described herein.

As further illustrated in FIG. 8, the automatic paragraph justification system 800 may further include a penalty optimization manager 804. The penalty optimization manager 804 can calculate optimum values of each typographic feature along with the percentage reduction in penalty that the application of feature results in relative to the original value. In some embodiments, the penalty optimization manager can process each typographic feature separately to determine optimum values. For example, the penalty optimization manager selects each typographic feature (word spacing, letter spacing, glyph scaling, etc.) and uses a binary search to pick values in a range relative to the original values used in the typeface. In some embodiments, the penalty optimization manager may provide the typographic feature values to a paragraph composer, such as paragraph layout manager 808, to calculate the penalty for that combination of values. The range may be selected to ensure that the features are minimally changed, reducing the perceptibility of the changes to the typeface. Once the optimal values of the features have been identified, these values and the corresponding penalty reduction values may be stored in typographic feature map 820, or other storage location accessible to storage manager 810.

As further illustrated in FIG. 8, the automatic paragraph justification system 800 may further include a typographic feature manager 806. As discussed, typographic feature manager 806 may be responsible for smartly prioritizing the order in which the typographic features are suggested to the user. A plurality of rules may be used to determine the priority of the typographic features. For example, the rules may be based on the number of violations that are reduced (e.g., the penalty reduction, number of hyphenations eliminated, etc.), font-specific rules, and/or feature rules that prioritize features based on which improve legibility and accessibility relative to other features.

As further illustrated in FIG. 8, the automatic paragraph justification system 800 may further include a paragraph layout manager 808. Paragraph layout manager 808 may implement various paragraph optimization techniques provided by word processing applications. For example, the paragraph layout manager 108 may be the Adobe Paragraph Composer provided by Adobe InDesign. However, any paragraph composer which provides penalty values for a paragraph (or more) of text when varying typographic features may be used.

As illustrated in FIG. 8, the automatic paragraph justification system 800 also includes the storage manager 810. The storage manager 810 maintains data for the automatic paragraph justification system 800. The storage manager 810 can maintain data of any type, size, or kind as necessary to perform the functions of the automatic paragraph justification system 800. The storage manager 810, as shown in FIG. 8, includes the input text 818. The input text 818 can include text selected from a word processing document or other source. The input text may be selected by the user in a word processing application implementing the automatic paragraph justification system 800.

As further illustrated in FIG. 8, the storage manager 810 also includes typographic feature map 820. Typographic feature map 820 can include a data structure that is used by penalty optimization manager 804 to store optimal typographic feature values. The typographic feature map 820 may also be accessible to typographic feature manager 806 to prioritize the optimal features before presenting them to the user. The storage manager 810 may also include justification rules 822. Justification rules 822 may include priority rules, font rules, and feature rules. As discussed, priority rules may define rules based on enhancement performance. Font rules may include different rules for serif typefaces and sans serif typefaces. Additionally, feature rules may define priority among different typographic features that are generally applicable to a variety of typefaces.

As such, embodiments, enable designers to design visually pleasing text paragraph layouts with little to no effort. This prevents scenarios in which kerning is too squashed or in which rivers (gaps between the words) are too large, thus interfering with the look and readability of the paragraphs. This also improves the readability of the text and accessibility—particularly beneficial to people with dyslexia. For example, the relevant Web Content Accessibility Guidelines (WCAG) 2.0 Success Criterion, 1.4.8, states: "People with some cognitive disabilities can read text more easily when the spacing between words is regular".

Each of the components 804-810 of the automatic paragraph justification system 800 and their corresponding elements (as shown in FIG. 8) may be in communication with one another using any suitable communication technologies. It will be recognized that although components 802-810 and their corresponding elements are shown to be separate in FIG. 8, any of components 802-810 and their corresponding elements may be combined into fewer components, such as into a single facility or module, divided into more components, or configured into different components as may serve a particular embodiment.

The components 802-810 and their corresponding elements can comprise software, hardware, or both. For example, the components 802-810 and their corresponding elements can comprise one or more instructions stored on a computer-readable storage medium and executable by processors of one or more computing devices. When executed by the one or more processors, the computer-executable instructions of the automatic paragraph justification system 800 can cause a client device and/or a server device to perform the methods described herein. Alternatively, the components 802-810 and their corresponding elements can comprise hardware, such as a special purpose processing device to perform a certain function or group of functions. Additionally, the components 802-810 and their corresponding elements can comprise a combination of computer-executable instructions and hardware.

Furthermore, the components 802-810 of the automatic paragraph justification system 800 may, for example, be implemented as one or more stand-alone applications, as one or more modules of an application, as one or more plug-ins, as one or more library functions or functions that may be called by other applications, and/or as a cloud-computing model. Thus, the components 802-810 of the automatic paragraph justification system 800 may be implemented as a stand-alone application, such as a desktop or mobile application. Furthermore, the components 802-810 of the automatic paragraph justification system 800 may be implemented as one or more web-based applications hosted on a remote server. Alternatively, or additionally, the components of the automatic paragraph justification system 800 may be implemented in a suit of mobile device applications or "apps." To illustrate, the components of the automatic paragraph justification system 800 may be implemented in a word processing application or a design application, including but not limited to applications in ADOBE CREATIVE CLOUD, such as ADOBE ACROBAT, ADOBE PHOTOSHOP, ADOBE PREMIERE, ADOBE LIGHTROOM, ADOBE ILLUSTATOR, and ADOBE INDESIGN. "ADOBE," "ACROBAT," "CREATIVE CLOUD," "PREMIERE," "PHOTOSHOP," "PREMIERE," "LIGHTROOM," "ILLUSTATOR," and "INDESIGN," are registered trademarks of Adobe Inc. in the United States and/or other countries.

Figure 9:
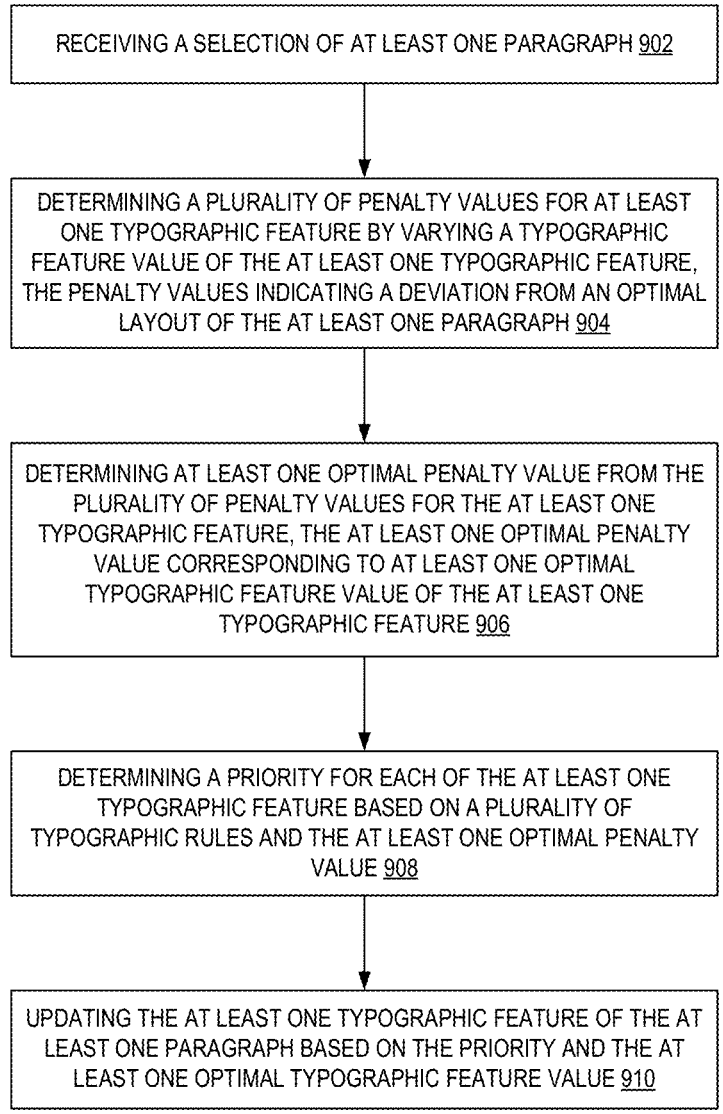
FIG. 9 illustrates a flowchart of a series of acts in a method of automatic enhancement of paragraph justification in accordance with one or more embodiments.

FIGS. 1-8, the corresponding text, and the examples, provide a number of different systems and devices that allows a user to facilitate selection of target individuals within digital visual media. In addition to the foregoing, embodiments can also be described in terms of flowcharts comprising acts and steps in a method for accomplishing a particular result. For example, FIG. 9 illustrates a flowchart of an exemplary method in accordance with one or more embodiments. The method described in relation to FIG. 9 may be performed with fewer or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart 900 of a series of acts in a method of automatic enhancement of paragraph justification in accordance with one or more embodiments. In one or more embodiments, the method 900 is performed in a digital medium environment that includes the automatic paragraph justification system 800. The method 900 is intended to be illustrative of one or more methods in accordance with the present disclosure and is not intended to limit potential embodiments. Alternative embodiments can include additional, fewer, or different steps than those articulated in FIG. 9.

As illustrated in FIG. 9, the method 900 includes an act 902 of receiving a selection of at least one paragraph. For example, the user may be composing a new, or existing, document in a word processing application and select a portion of the document (e.g., at least one paragraph) using an input device (e.g., a mouse, keyboard, touchscreen, etc.). The user can then invoke the automatic paragraph justification system by selecting a UI element associated with the automatic paragraph justification system in the user interface (e.g., by right clicking and selecting from the context menu, by selecting from a menu in the menu bar, via a graphical element, etc.).

As illustrated in FIG. 9, the method 900 further includes an act 904 of determining a plurality of penalty values for at least one typographic feature by varying a typographic feature value of the at least one typographic feature, the penalty values indicating a deviation from an optimal layout of the at least one paragraph. Various typographic features may be modified to determine the resulting penalty values. For example, determining the plurality of penalty values may include determining a first plurality of penalty values for a word spacing typographic feature by varying a word spacing value, determining a second plurality of penalty values for a letter spacing typographic feature by varying a letter spacing value, and determining a third plurality of penalty values for a glyph size typographic feature by varying a glyph size value. In some embodiments, more or fewer typographic feature values may be varied.

In some embodiments, a search algorithm may be used to determine which values of each typographic feature are used to determine a corresponding penalty value. For example, determining the plurality of penalty values may include using a search algorithm to select a plurality of typographic feature values within a range of values relative to an original typographic feature value of the at least one paragraph, and calculating the plurality of penalty values corresponding to the plurality of typographic feature values within the range of values.

As illustrated in FIG. 9, the method 900 further includes an act 906 of determining at least one optimal penalty value from the plurality of penalty values for the at least one typographic feature, the at least one optimal penalty value corresponding to at least one optimal typographic feature value of the at least one typographic feature. In some embodiments, each typographic feature may be evaluated in turn to identify its optimal value and corresponding penalty reduction. For example, in some embodiments determining the at least one penalty value further includes calculating a first penalty value corresponding to a maximum typographic feature value in the range of values and a second penalty value corresponding to a minimum typographic feature value in the range of values, calculating a third penalty value corresponding to a typographic feature value between the minimum typographic feature value and the maximum typographic feature value, if a difference between the third penalty value and the first penalty value is less than a threshold then changing a maximum value of the range to the typographic feature value between the minimum typographic feature value and the maximum typographic feature value to create a new range, otherwise changing a minimum value of the range to the typographic feature value between the minimum typographic feature value and the maximum typographic feature value to create the new range, and iteratively calculating new penalty values based on the new range until the optimal penalty value is determined.

As illustrated in FIG. 9, the method 900 further includes an act 908 of determining a priority for each of the at least one typographic feature based on a plurality of justification rules and the at least one optimal penalty value. In some embodiments, the justification rules may be based on specific font characteristics, rules based on legibility and accessibility, etc. For example, determining the priority may further include determining a typographic feature from the at least one typographic feature having a largest penalty reduction as a first priority. In some embodiments, determining the priority may further include determining a typographic feature from the at least one typographic feature based on hyphenation points as a second priority. In some embodiments, determining the priority may further include determining reductions in word spacing to have a higher priority than reduction in letter spacing which has a higher priority than glyph scaling. In some embodiments, determining the priority may further include determining reductions in letter spacing to have a higher priority than increases in letter spacing. In some embodiments, determining the priority may further include determining the priority for each of the at least one typographic feature based on font metrics.

As illustrated in FIG. 9, the method 900 further includes an act 910 of updating the at least one typographic feature of the at least one paragraph based on the priority and the at least one optimal typographic feature value. For example, the optimal typographic feature values may be applied to the selected text, resulting in an updated layout of the selected text that reduces the penalty associated with the text. In some embodiments, the user may provide input as to which optimal typographic feature values are to be applied to the text. For example, updating the at least one typographic feature may further include causing a graphical user interface element to be rendered which indicates the priority for each of the at least one typographic feature, receiving a selection of one or more of the at least one typographic feature via the graphical user interface element, and applying the at least one optimal typographic feature value corresponding to the selection to the at least one paragraph.

Figure 10:
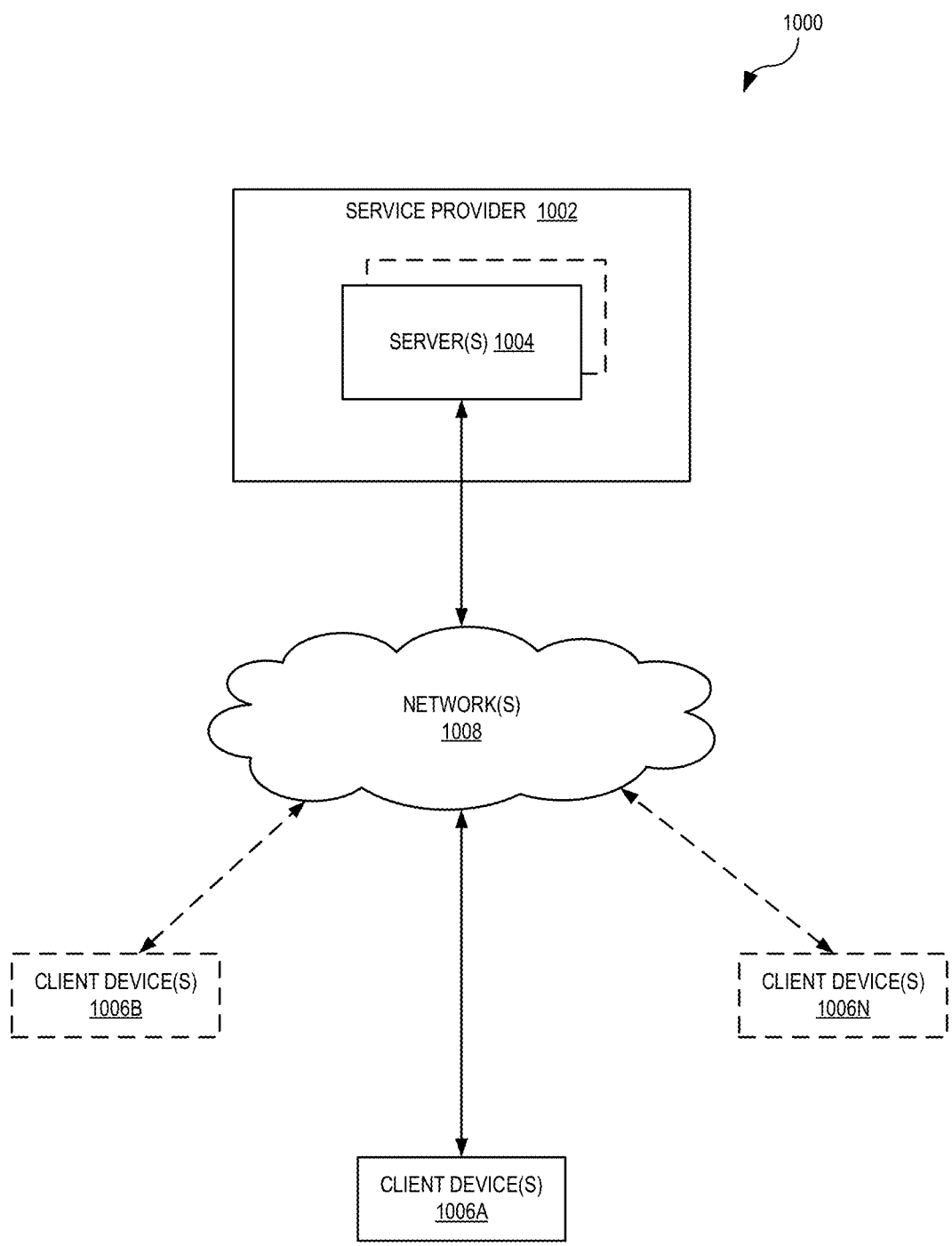
FIG. 10 illustrates a schematic diagram of an exemplary environment in which the text processing system can operate in accordance with one or more embodiments.

FIG. 10 illustrates a schematic diagram of an exemplary environment 1000 in which the automatic paragraph justification system 800 can operate in accordance with one or more embodiments. In one or more embodiments, the environment 1000 includes a service provider 1002 which may include one or more servers 1004 connected to a plurality of client devices 1006A-1006N via one or more networks 1008. The client devices 1006A-1006N, the one or more networks 1008, the service provider 1002, and the one or more servers 1004 may communicate with each other or other components using any communication platforms and technologies suitable for transporting data and/or communication signals, including any known communication technologies, devices, media, and protocols supportive of remote data communications, examples of which will be described in more detail below with respect to FIG. 11.

Although FIG. 10 illustrates a particular arrangement of the client devices 1006A-1006N, the one or more networks 1008, the service provider 1002, and the one or more servers 1004, various additional arrangements are possible. For example, the client devices 1006A-1006N may directly communicate with the one or more servers 1004, bypassing the network 1008. Or alternatively, the client devices 1006A-1006N may directly communicate with each other. The service provider 1002 may be a public cloud service provider which owns and operates their own infrastructure in one or more data centers and provides this infrastructure to customers and end users on demand to host applications on the one or more servers 1004. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1004. In some embodiments, the service provider may be a private cloud provider which maintains cloud infrastructure for a single organization. The one or more servers 1004 may similarly include one or more hardware servers, each with its own computing resources, which are divided among applications hosted by the one or more servers for use by members of the organization or their customers.

Similarly, although the environment 1000 of FIG. 10 is depicted as having various components, the environment 1000 may have additional or alternative components. For example, the environment 1000 can be implemented on a single computing device with the automatic paragraph justification system 800. In particular, the automatic paragraph justification system 800 may be implemented in whole or in part on the client device 1002A.

As illustrated in FIG. 10, the environment 1000 may include client devices 1006A-1006N. The client devices 1006A-1006N may comprise any computing device. For example, client devices 1006A-1006N may comprise one or more personal computers, laptop computers, mobile devices, mobile phones, tablets, special purpose computers, TVs, or other computing devices, including computing devices described below with regard to FIG. 11. Although three client devices are shown in FIG. 10, it will be appreciated that client devices 1006A-1006N may comprise any number of client devices (greater or smaller than shown).

Moreover, as illustrated in FIG. 10, the client devices 1006A-1006N and the one or more servers 1004 may communicate via one or more networks 1008. The one or more networks 1008 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1008 may be any suitable network over which the client devices 1006A-1006N may access service provider 1002 and server 1004, or vice versa. The one or more networks 1008 will be discussed in more detail below with regard to FIG. 11.

In addition, the environment 1000 may also include one or more servers 1004. The one or more servers 1004 may generate, store, receive, and transmit any type of data, including input text 818, typographic feature map 820, justification rules 822, or other information. For example, a server 1004 may receive data from a client device, such as the client device 1006A, and send the data to another client device, such as the client device 1002B and/or 1002N. The server 1004 can also transmit electronic messages between one or more users of the environment 1000. In one example embodiment, the server 1004 is a data server. The server 1004 can also comprise a communication server or a web-hosting server. Additional details regarding the server 1004 will be discussed below with respect to FIG. 11.

As mentioned, in one or more embodiments, the one or more servers 1004 can include or implement at least a portion of the automatic paragraph justification system 800. In particular, the automatic paragraph justification system 800 can comprise an application running on the one or more servers 1004 or a portion of the automatic paragraph justification system 800 can be downloaded from the one or more servers 1004. For example, the automatic paragraph justification system 800 can include a web hosting application that allows the client devices 1006A-1006N to interact with content hosted at the one or more servers 1004. To illustrate, in one or more embodiments of the environment 1000, one or more client devices 1006A-1006N can access a webpage supported by the one or more servers 1004. In particular, the client device 1006A can run a web application (e.g., a web browser) to allow a user to access, view, and/or interact with a webpage or website hosted at the one or more servers 1004.

Upon the client device 1006A accessing a webpage or other web application hosted at the one or more servers 1004, in one or more embodiments, the one or more servers 1004 can provide access to one or more word processing documents or other files including text (e.g., including input text 818) stored at the one or more servers 1004. Moreover, the client device 1006A can receive a request (i.e., via user input) to enhance the justification of selected text and provide the request to the one or more servers 1004. Upon receiving the request, the one or more servers 1004 can automatically perform the methods and processes described above to enhance the justification of the selected text. The one or more servers 1004 can return recommended optimizations to be applied to the selected text, to the client device 1006A for display to the user.

As just described, the automatic paragraph justification system 800 may be implemented in whole, or in part, by the individual elements 1002-1008 of the environment 1000. It will be appreciated that although certain components of the automatic paragraph justification system 800 are described in the previous examples with regard to particular elements of the environment 1000, various alternative implementations are possible. For instance, in one or more embodiments, the automatic paragraph justification system 800 is implemented on any of the client devices 1006A-N. Similarly, in one or more embodiments, the automatic paragraph justification system 800 may be implemented on the one or more servers 1004. Moreover, different components and functions of the automatic paragraph justification system 800 may be implemented separately among client devices 1006A-1006N, the one or more servers 1004, and the network 1008.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
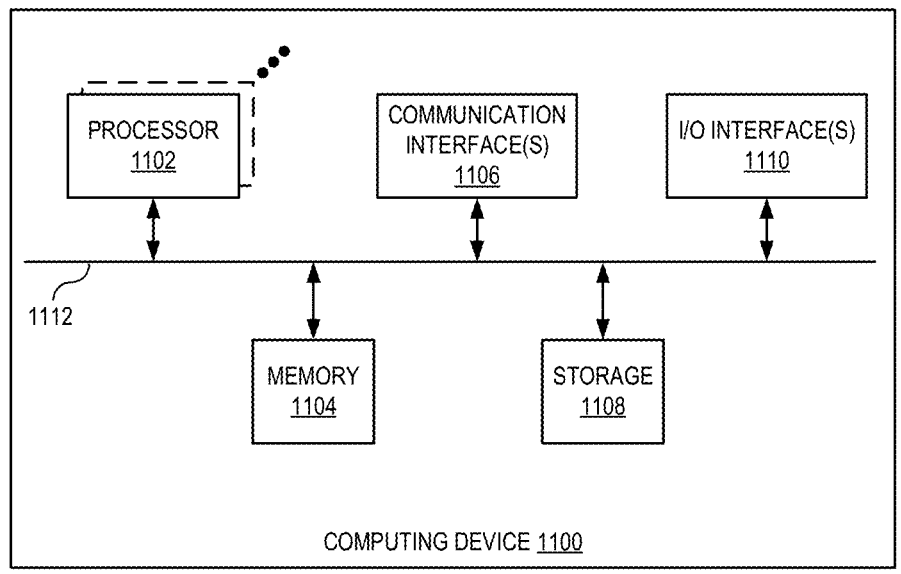
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that one or more computing devices such as the computing device 1100 may implement the image processing system. As shown by FIG. 11, the computing device can comprise a processor 1102, memory 1104, one or more communication interfaces 1106, a storage device 1108, and one or more I/O devices/interfaces 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1108 and decode and execute them. In various embodiments, the processor(s) 1102 may include one or more central processing units (CPUs), graphics processing units (GPUs), field programmable gate arrays (FPGAs), systems on chip (SoC), or other processor(s) or combinations of processors.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 can further include one or more communication interfaces 1106. A communication interface 1106 can include hardware, software, or both. The communication interface 1106 can provide one or more interfaces for communication (such as, for example, packet-based communication) between the computing device and one or more other computing devices 1100 or one or more networks. As an example and not by way of limitation, communication interface 1106 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

The computing device 1100 includes a storage device 1108 includes storage for storing data or instructions. As an example, and not by way of limitation, storage device 1108 can comprise a non-transitory storage medium described above. The storage device 1108 may include a hard disk drive (HDD), flash memory, a Universal Serial Bus (USB) drive or a combination these or other storage devices. The computing device 1100 also includes one or more input or output ("I/O") devices/interfaces 1110, which are provided to allow a user to provide input to (such as user strokes), receive output from, and otherwise transfer data to and from the computing device 1100. These I/O devices/interfaces 1110 may include a mouse, keypad or a keyboard, a touch screen, camera, optical scanner, network interface, modem, other known I/O devices or a combination of such I/O devices/interfaces 1110. The touch screen may be activated with a stylus or a finger.

The I/O devices/interfaces 1110 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1110 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
receiving a selection of a paragraph, the paragraph comprising text formatted according to a particular typeface, the particular typeface comprising an original typographic feature value of a typographic feature of the particular typeface;

determining a plurality of penalty values for a plurality of typographic feature values within a range of typographic feature values, the range of typographic feature values selected based on the original typographic feature value of the typographic feature of the particular typeface, each penalty value of the plurality of penalty values indicating a respective deviation from an optimal layout of the paragraph;

determining an optimal penalty value from the plurality of penalty values, the optimal penalty value corresponding to an optimal typographic feature value of the the plurality of typographic feature values;

determining a priority for the typographic feature based on a plurality of justification rules and the optimal penalty value; and updating the typographic feature of the paragraph based on the priority and the optimal typographic feature value.

2. The computer-implemented method of claim 1, wherein the plurality of penalty values is a first plurality of penalty values, wherein the typographic feature is word spacing, and wherein the computer-implemented method further comprises:

determining a second plurality of penalty values for a letter spacing typographic feature by varying a letter spacing value; and determining a third plurality of penalty values for a glyph size typographic feature by varying a glyph size value.

3. The computer-implemented method of claim 1, further comprising:

using a search algorithm to select the plurality of typographic feature values within the range of typographic feature values.

4. The computer-implemented method of claim 1, further comprising:

calculating a first penalty value corresponding to a maximum typographic feature value in the range of typographic feature values and a second penalty value corresponding to a minimum typographic feature value in the range of typographic feature values;

calculating a third penalty value corresponding to a typographic feature value between the minimum typographic feature value and the maximum typographic feature value;

if a difference between the third penalty value and the first penalty value is less than a threshold then changing a maximum value of the range of typographic feature values to the typographic feature value between the minimum typographic feature value and the maximum typographic feature value to create a new range of typographic feature values, otherwise changing a minimum value of the range of typographic feature values to the typographic feature value between the minimum typographic feature value and the maximum typographic feature value to create a new range of typographic feature values; and iteratively calculating new penalty values based on a new range of typographic feature values until the optimal penalty value is determined.

5. The computer-implemented method of claim 1, further comprising:

determining the priority for the typographic feature based on the typographic feature having a largest penalty reduction among a plurality of typographic features.

6. The computer-implemented method of claim 1, further comprising:

determining the priority for the typographic feature based on the typographic feature having a largest reduction in hyphenation points among a plurality of typographic features.

7. The computer-implemented method of claim 1, further comprising:

determining reductions in word spacing to have a higher priority than reduction in letter spacing which has a higher priority than glyph scaling.

8. The computer-implemented method of claim 1, further comprising:

determining reductions in letter spacing to have a higher priority than increases in letter spacing.

9. The computer-implemented method of claim 1, further comprising:

determining the priority for the typographic feature based on font metrics.

10. The computer-implemented method of further claim 1, further comprising:

causing a graphical user interface element to be rendered which indicates the priority for the typographic feature;

receiving a selection of one or more of the typographic feature via the graphical user interface element; and applying the optimal typographic feature value corresponding to the selection to the paragraph.

11. A non-transitory computer-readable storage medium including instructions stored thereon which, when executed by at least one processor, cause the at least one processor to:

receive a selection of a paragraph, the paragraph comprising text formatted according to a particular typeface, the particular typeface comprising an original typographic feature value of a typographic feature of the particular typeface;

determine a plurality of penalty values for a plurality of typographic feature values within a range of typographic feature values, the range of typographic feature values selected based on the original typographic feature value of the typographic feature of the particular typeface, each penalty value of the plurality of penalty values indicating a respective deviation from an optimal layout of the paragraph;

determine an optimal penalty value from the plurality of penalty values for, the optimal penalty value corresponding to an optimal typographic feature value of the plurality of typographic feature values;

determine a priority for the typographic feature based on a plurality of justification rules and the optimal penalty value; and update the typographic feature of the paragraph based on the priority and the optimal typographic feature value.

12. The non-transitory computer-readable storage medium of claim 11, wherein the plurality of penalty values is a first plurality of penalty values, wherein the typographic feature is word spacing, and wherein the instructions, when executed, further cause the at least one processor to:

determine a second plurality of penalty values for a letter spacing typographic feature by varying a letter spacing value; and determine a third plurality of penalty values for a glyph size typographic feature by varying a glyph size value.

13. The non-transitory computer-readable storage medium of claim 11, wherein the instructions, when executed, further cause the at least one processor to:

use a search algorithm to select the plurality of typographic feature values within the range of typographic feature values.

14. The non-transitory computer-readable storage medium of claim 11, wherein the instructions, when executed, further cause the at least one processor to:
calculate a first penalty value corresponding to a maximum typographic feature value in the range of typographic feature values and a second penalty value corresponding to a minimum typographic feature value in the range of typographic feature values;
calculate a third penalty value corresponding to a typographic feature value between the minimum typographic feature value and the maximum typographic feature value;
if a difference between the third penalty value and the first penalty value is less than a threshold then change a maximum value of the range of typographic feature values to the typographic feature value between the minimum typographic feature value and the maximum typographic feature value to create a new range of typographic feature values, otherwise change a minimum value of the range of typographic feature values to the typographic feature value between the minimum typographic feature value and the maximum typographic feature value to create a new range of typographic feature values; and
iteratively calculate new penalty values based on a new range of typographic feature values until the optimal penalty value is determined.

15. A system, comprising:
at least one processor and a memory including instructions stored thereon which, when executed by at least one processor, cause the system to
receive a selection of a paragraph, the paragraph comprising text formatted according to a particular typeface, the particular typeface comprising an original typographic feature value of a typographic feature of the particular typeface;
determine a plurality of penalty values for a plurality of typographic feature values within a range of typographic feature values, the range of typographic feature values selected based on the original typographic feature value of the typographic feature of the particular typeface, each penalty value of the plurality of penalty values indicating a respective deviation from an optimal layout of the paragraph;
determine an optimal penalty value from the plurality of penalty values for, the optimal penalty value corresponding to an optimal typographic feature value of the plurality of typographic feature values;
determine a priority for the typographic feature based on a plurality of justification rules and the optimal penalty value; and
update the typographic feature of the paragraph based on the priority and the optimal typographic feature value.

16. The system of claim 15, wherein the instructions, when executed, further cause the system to:
determine the priority based on the typographic feature having a largest penalty reduction among a plurality of typographic features.

17. The system of claim 15, wherein the instructions, when executed, further cause the system to:
determine the priority based on the typographic feature having a largest reduction in hyphenation points among a plurality of typographic features.

18. The system of claim 15, wherein the instructions, when executed, further cause the system to:
determine reductions in word spacing to have a higher priority than reduction in letter spacing which has a higher priority than glyph scaling.

19. The system of claim 15, wherein the instructions, when executed, further cause the system to:
determine reductions in letter spacing to have a higher priority than increases in letter spacing.

20. The system of claim 15, wherein the instructions, when executed, further cause the system to:
determine the priority for the typographic feature based on font metrics.

* * * * *